J. GERARD.
CARVING-FORK.
No. 171,931. Patented Jan. 11, 1876.
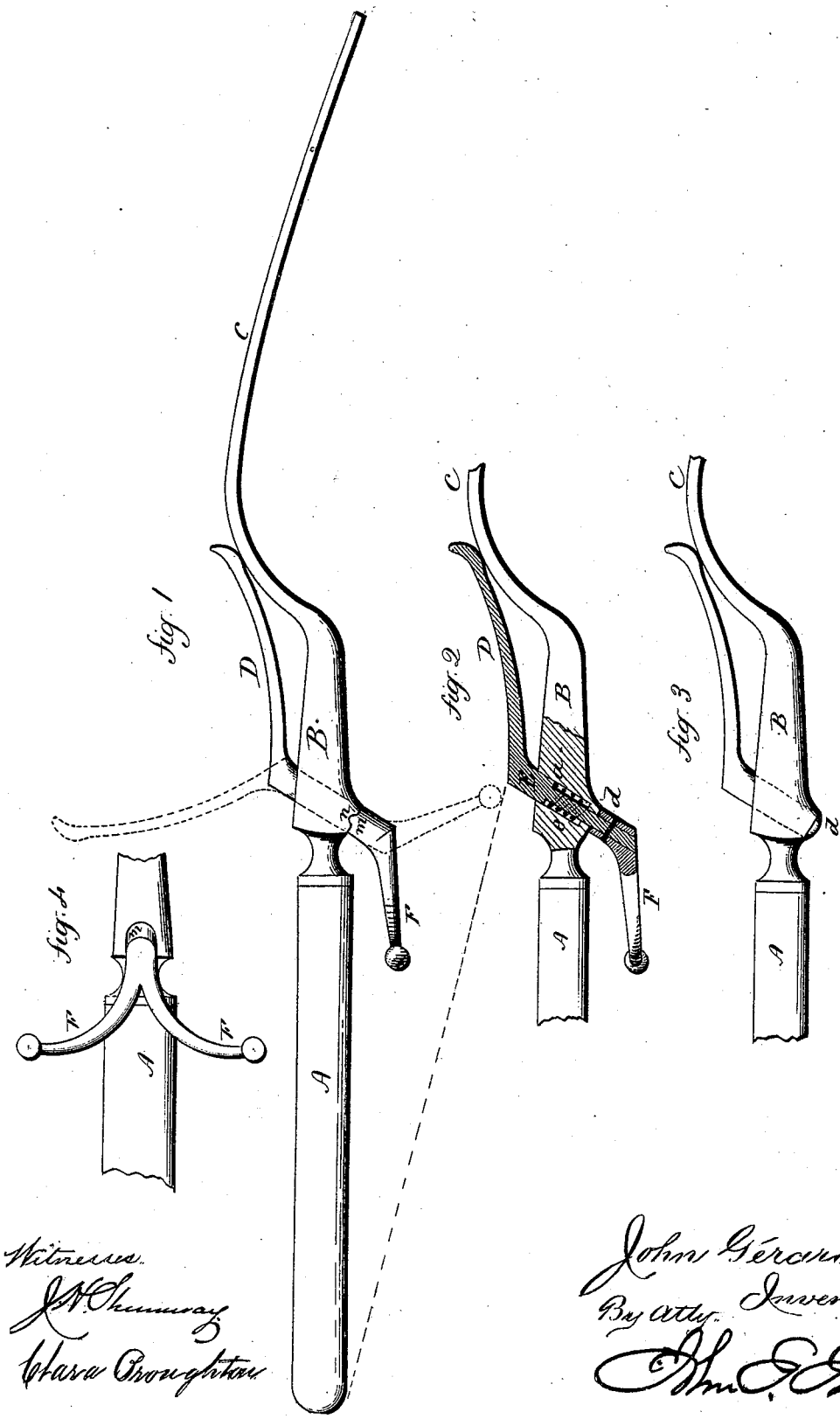

UNITED STATES PATENT OFFICE.

JOHN GÉRARD, OF NEW BRITAIN, CONNECTICUT.

IMPROVEMENT IN CARVING-FORKS.

Specification forming part of Letters Patent No. 171,931, dated January 11, 1876; application filed December 15, 1875.

*To all whom it may concern:*

Be it known that I, JOHN GÉRARD, of New Britain, in the county of Hartford and State of Connecticut, have invented a new Improvement in Carving-Forks; and I do hereby declare the following, when taken in connection with the accompanying drawings and the letters of reference marked thereon, to be a full, clear, and exact description of the same, and which said drawings constitute part of this specification, and represent, in—

Figure 1, side view; Fig. 2, longitudinal central section; Fig. 3, side view, showing the guard without the rest; Fig. 4, under-side view.

This invention relates to an improvement in carving-forks—especially to the construction and arrangement of the guard. In the usual construction the guard is hinged in a slot on the back of the shank of the fork, with a feather-spring beneath to retain it in either its open or closed position. The exposure of this groove to water in washing soon destroys the spring, or the hinge-joint becomes so much worn that the guard is loosened, so as to be of no use as a guard.

The object of this invention is to overcome this difficulty, as well as to provide the fork with a rest to support the tines in an elevated position on the table; and it consists, first, in constructing the guard with a spindle or shank set vertically into the shank of the fork, so as to form an axis upon which to rotate the guard, combined with a spring to set the guard in either the open or closed position; and, secondly, in attaching a rest to the spindle of the guard, which, when the guard is opened, will bring the rest forward, so as to form a support for the fork when set upon the table, and the closing of the guard will return the rest.

A is the handle, B the shank, and C the tines, of a fork, of substantially the usual shape. D is the guard, formed with the spindle E turning down toward the shank, and fitting into a seat made in the shank, and so that the guard may be rotated, the said spindle forming the pivot for so turning. The spindle within the shank is reduced so as to form a shoulder, *a*, and then extends through to the opposite side, upon which a head, *d*, or collar, is made, to prevent the withdrawal of the spindle from its seat, and around the reduced portion of the spindle is a spring, *e*, the tendency of which is to force the head or collar *d* up against the under side of the shank. At some convenient point upon the under side there is a notch, *n*, formed radially from the spindle in the shank, and a corresponding projection, *m*, on the collar, or these may be reversed. This notch is made upon opposite sides of the spindle, and so that when the spindle is in its closed condition, as seen in Fig. 1, it will be held there by the projection *m* in the notch *n*, but so that the guard may be easily turned half around, and then the notch and projection, coinciding upon the opposite sides, will hold the guard in that position.

The spindle may be at right angles through the shank, but it is preferable to make it diagonally, as shown, because in turning the guard for use it will come into a more vertical position, as shown in broken line.

To form the rest there is attached to the spindle, or the spindle extended so as to form, an arm or arms, F, substantially parallel with the handle when the guard is in its closed position; but when the guard is turned to the rear or "guard position," the arm F will also be turned, and into a position forward of the center of gravity between the handle and tines, and so that the fork will rest upon the tip of the handle and arms F, as indicated in broken lines, Fig. 1. The guard, as described, and as shown in Fig. 3, may be used with another construction of guard, so that one is not positively essential to the other.

While the notch and projection *m n* are desirable as means for holding the guard or rest, or both, in either of these two positions, they are not essential, because the friction of the spring of itself may do that; and, further, the spring is not essential, as that may be dispensed with, and the friction between the surface of the shank and the spindle be sufficient to retain the guard and rest in the position in which they may be set.

While specially designed for carving-forks, this rest and guard are applicable to other articles, as the knife or steel; and therefore, by the expression "carving-fork," I wish to be understood as embracing other articles to which the invention is applicable.

I claim—

1. In a carving-fork, the guard D, formed with a spindle, E, seated in the shank of the fork, and so as to be rotated, the said spindle forming the axis upon which the guard turns, substantially as described.

2. In a carving-fork, the guard D, formed with a spindle, E, seated in the shank of the fork, and so as to be rotated, the said spindle forming the axis upon which the guard turns, combined with a spring around the said spindle, substantially as described.

3. In a carving-fork, the guard D, formed with a spindle, E, seated in the shank of the fork, and so as to be rotated, the said spindle forming the axis upon which the guard turns, combined with a spring around the said spindle, with the notch and projection $m$ $n$ on the shank and head of the spindle, substantially as described.

4. In a carving-fork, the rest F, attached to or made a part of the spindle seated in the shank of the fork, and so as to be rotated, the said spindle being the axis on which the guard turns, substantially as described.

5. In a carving-fork, the rest F, attached to or made a part of the spindle seated in the shank of the fork, and so as to be rotated, the said spindle being the axis on which the guard turns, combined with the spring around the spindle within the shank, substantially as described.

6. In a carving-fork, the rest F, attached to or made a part of the spindle seated in the shank of the fork, and so as to be rotated, the said spindle being the axis on which the guard turns, combined with the spring around the spindle within the shank, and the notch and projection $m$ $n$ on the shank of the fork and spindle, substantially as described.

JOHN GÉRARD.

Witnesses:
 JOHN E. EARLE,
 CLARA BROUGHTON.